May 26, 1931.  G. M. BOOTH  1,806,606
AUTO TOWING DEVICE
Filed Sept. 25, 1929  2 Sheets-Sheet 1
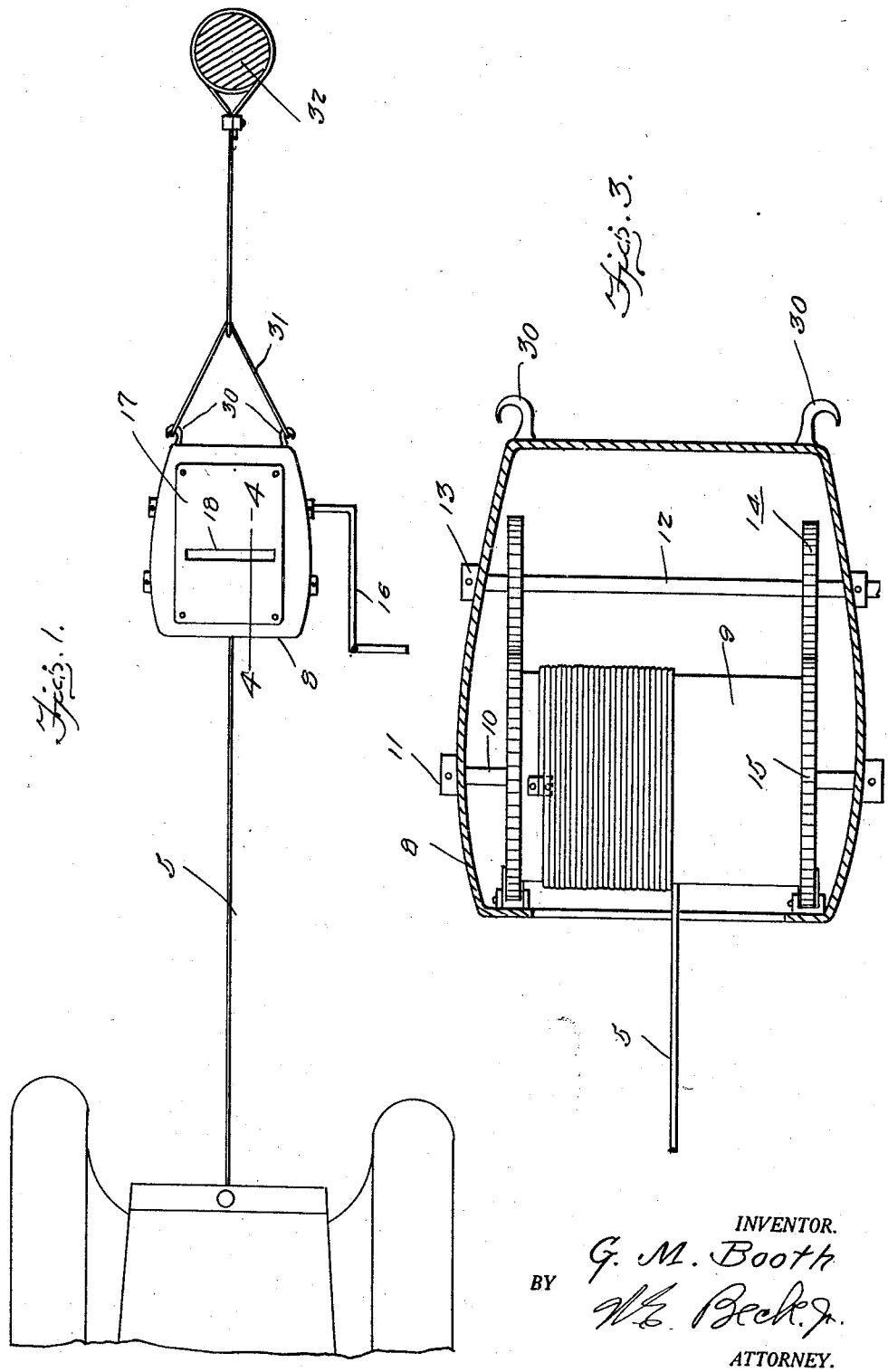
INVENTOR.
G. M. Booth
BY
ATTORNEY.

May 26, 1931.  G. M. BOOTH  1,806,606
AUTO TOWING DEVICE
Filed Sept. 25, 1929  2 Sheets-Sheet 2
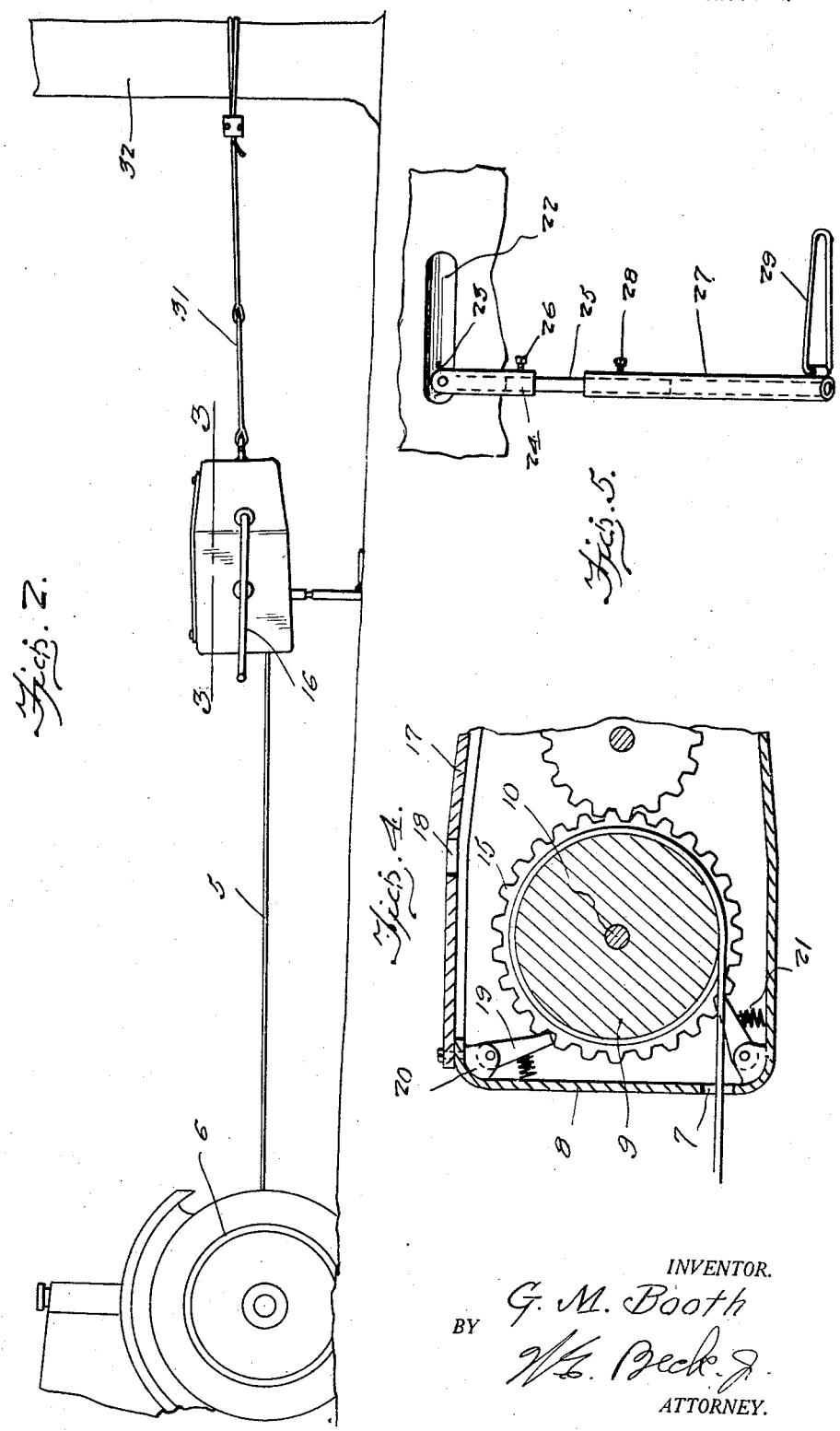
INVENTOR.
G. M. Booth
BY
ATTORNEY.

Patented May 26, 1931

1,806,606

UNITED STATES PATENT OFFICE

GARRY MOORE BOOTH, OF DEARBORN, MICHIGAN

AUTO TOWING DEVICE

Application filed September 25, 1929. Serial No. 395,072.

The present invention relates to automobile tow devices adapted for pulling stalled automobiles out of mud or similar places where it is impossible to use the power of the automobile for moving the same. The invention has for its principal object to provide a manually operable cable winding drum about which to wind the tow line to perform the pulling operation.

Another object is to provide a folding support for the drum having a foot rest by means of which the operator may secure the same in a position upon the ground while operating the drum.

Other objects and advantages reside in the special construction, combination and arrangement of the various elements forming the invention, as more fully hereinafter described and claimed, reference being had to the accompanying drawings forming part hereof, wherein like numerals refer to like parts throughout the specification and in which, Figure 1 is a top plan view showing the device in operative position, Figure 2 is a side elevational view, Figure 3 is a horizontal sectional view through the drum housing on the line 3—3 of Fig. 2, Figure 4 is a fragmentary vertical sectional view on the line 4—4 of Fig. 1, and Figure 5 is a perspective view of the supporting member shown in position attached to the under side of the housing.

Referring now to the drawings in detail, wherein for the purpose of illustration I have disclosed a preferred embodiment of my invention, the numeral 5 designates a tow rope having one end attached to a suitable part of a stalled automobile 6.

The opposite end of the rope is extended through an opening 7 formed in one of the walls of the drum housing 8 and attached to the drum 9 mounted in the housing upon a shaft 10. As more clearly illustrated in Figure 3 of the drawings, the ends of the shaft 10 are journalled in bearing brackets 11 at opposite sides of the housing. A crank shaft 12 is also journalled in bearing brackets 13 at opposite sides of the housing and extends transversely of the housing parallel with the shaft 10 and is provided adjacent each end with spur gears 14 engaging similar gears 15 formed at opposite ends of the drum 9. One end of the shaft 12 extends outwardly of the housing and is connected with a crank 16 for manually operating the drum. The top of the housing is provided with a removable cover 17 having a peep opening 18 therein for the inspection of the parts within the housing and for permitting the lubricating of the gears. A pair of pawls 19 are pivotally mounted upon brackets 20 at the inner wall of the housing with the free end of the pawls engageable with the teeth of the gears 15 for preventing retrograde movement of the drum while the tow line is being wound about the same. Expansion springs 21 are arranged in engagement with the pawls for maintaining the free ends thereof in engaged position.

At the under side of the housing is formed a recess 22 with a lug 23 at one end thereof and to which is pivotally attached a relatively short tubular member 24 having a rod 25 slidably inserted in its free end and retained in longitudinally adjusted position in said member by a set screw 26. The other end of the rod is inserted in a tubular rod 27 also adjustably retained therein by a set screw 28. To the free end of the tubular rod 27 is pivotally attached a wire foot rest 29 upon which the foot of the operator may be placed after resting the lower end of the rod 27 upon the ground for holding the drum housing against movement during the operation of the crank.

A pair of hooks 30 are formed at the end of the housing opposite from the tow line 5 to which a rope or cable 31 may be attached for securing the housing to a tree or other stationary object 32. By attaching the device in the manner indicated and upon the winding of the tow line about the drum it will be obvious that the vehicle will be pulled from the mud or other position in which the same may be stalled. When the device is not in use the rods 25 and 27 may be removed from the tubular member 24 and the foot rest folded against the rods for storing in the car. The tubular member 24 may then be folded in the recess 22.

It is obvious that the invention is susceptible of various changes and modifications without departing from the spirit thereof, or the scope of the appended claims, and I accordingly claim as my own all such forms of the invention to which I am entitled.

I claim:

1. An automobile tow of the class described comprising a housing having attaching hooks at one end, a cable winding drum arranged therein having gears carried thereby, a crank shaft journalled in the housing having gears connected with the gears of said drum, a crank arm for said shaft, a support for said housing and a foot rest for the support whereby to enable the operator to hold the housing against movement during the operation thereof.

2. An automobile tow of the class described comprising a housing having attaching hooks at one end, a cable winding drum arranged therein having gears carried thereby, a crank shaft journalled in the housing having gears connected with the gears of said drum, a crank arm for said shaft, a recess formed in the under side of the housing, a tubular member pivoted to the housing and adapted for movement into said recess when not in use, a telescoping support for the housing detachably carried by said tubular member having means for adjustably securing the same to said member and a foldable foot rest for the free end of said support whereby to receive the foot of the operator for anchoring the housing against movement during the operation thereof.

In testimony whereof I affix my signature.

GARRY MOORE BOOTH.